United States Patent [19]

Nakajima

[11] Patent Number: 5,200,774
[45] Date of Patent: Apr. 6, 1993

[54] CAMERA WITH AUTO PROGRAM ZOOM CONTROL AND EYE SENSING CONTROL

[75] Inventor: Hidekazu Nakajima, Kawachinagano, Japan

[73] Assignee: Minolta Camera Kabushiki Kaisha, Osaka, Japan

[21] Appl. No.: 721,246

[22] Filed: Jun. 26, 1991

[30] Foreign Application Priority Data

Jun. 26, 1990 [JP] Japan .................. 2-169302
Jun. 26, 1990 [JP] Japan .................. 2-169303
Jun. 26, 1990 [JP] Japan .................. 2-169304
Jun. 26, 1990 [JP] Japan .................. 2-169305
Jun. 27, 1990 [JP] Japan .................. 2-169430

[51] Int. Cl.[5] .................. G03B 29/00; G03B 13/02
[52] U.S. Cl. .................. 354/62; 354/219
[58] Field of Search .................. 354/62, 195.1, 219

[56] References Cited

U.S. PATENT DOCUMENTS

| | | | |
|---|---|---|---|
| 4,603,957 | 8/1986 | Suzuki .................. | 354/410 |
| 4,836,670 | 6/1989 | Hutchinson .................. | 354/62 X |
| 4,951,068 | 8/1990 | Ichikawa et al. .................. | 354/149.11 |
| 5,036,347 | 7/1991 | Tsunekawa et al. .................. | 354/219 X |
| 5,138,354 | 8/1992 | Okada et al. .................. | 354/219 X |

FOREIGN PATENT DOCUMENTS 64-42639 2/1989 Japan .

Primary Examiner—Donald A. Griffin
Assistant Examiner—J. K. Han
Attorney, Agent, or Firm—Burns, Doane, Swecker & Mathis

[57] ABSTRACT

In a camera having auto program zoom control, eye sensing control is used to determine if an object is adjacent to a viewfinder. The eye sensing control preferably includes a light emitting source and photocell. Light is emitted at first intervals, if no object is detected as being adjacent to the viewfinder, and light is emitted at second shorter intervals, if an object is detected as being adjacent to the viewfinder. Emitting light at different intervals results in conserving electrical energy.

3 Claims, 16 Drawing Sheets

CAMERA WITH AUTO PROGRAM ZOOM CONTROL AND EYE SENSING CONTROL

BACKGROUND OF THE INVENTION

The present invention relates to a camera and more particularly, a camera with an auto program zoom control.

A camera with an auto program zoom (abbreviated to APZ) control is well known and widely appreciated. The APZ control comprises the steps of measuring an object distance D, systematically calculating a rate of zooming magnification from a program line representing the relation between object distance D and magnification $\beta$, calculating a focal length f from the formula, f (focal distance)=$\beta \times$D and activating a zooming motor for setting the focal length of a zoom lens unit to the calculated value f.

Also, an auto power-off (abbreviated to APO) control is successfully employed so that when a given time has passed after the manipulation of switches and control means was ceased with a main power switch remaining turned on, unnecessary functions such as information on a display panel are deenergized for the purpose of energy saving. The APZ control allows the zooming action to be controlled by f=$\beta \times$D, where D is the object distance and $\beta$ is the zooming magnification, for setting the focal length to f. Even if the object distance D remains unchanged for a given time, both the measurement of the object distance and the calculation of the focal length are carried out.

It is however understood that when no shutter release action is executed after the framing is fixed through the APZ control by an operator of the camera, both the measurement of the object distance and the calculation of the focal length become unnecessary. In addition, the action for such measurement and calculation is no more needed when the camera is not in use, for example, when installed in a camera case, with the switch for APZ control remaining turned on and will lead to unwanted energy consumption.

A technique of so-called intermittent charging is also known in which charging to an electronic flash unit built in the camera is conducted at equal intervals of a given time. As understood, if the charging of the flash unit remains incompleted, a shutter release action cannot be performed. While a known uncharge locking action is introduced, a chance for releasing the shutter will be lost.

A camera with an eye sensing control is also provided which can automatically be energized when its viewfinder is used by the camera operator. For example, disclosed in Japanese Patent Laid-open Publication 64-42639 (1989) is a camera which has a viewfinder provided with a light emitting diode and a light receiving diode so that when the viewfinder is peeped, the reflection of a light emitted from the light emitting diode is detected by the light receiving diode and thus, the driving of an auto focus lens unit starts. However, such a prior art camera allows the detection of a reflected light to be executed only once and erroneous detection caused by the effects of noise signals may be involved.

SUMMARY OF THE INVENTION

It is an object of the present invention to eliminate the foregoing drawbacks. A camera according to the present invention is improved in which when change of the focal length, which is carried out for becoming a current focal length associated with a current object distance, is not needed for a given time or the framing remains unchanged, its action is inhibited, thus preventing unnecessary consumption of electrical energy.

Also, according to the present invention, charging to an electronic flash unit is conducted when no shutter release action is executed for a considerable length of time after the framing is fixed by an operator of the camera. Consequently, the charging has been made to a certain level before a shutter release action is called for. Thus, the shutter release locking action for completion of charging will be minimized and a shutter chance will rarely be lost.

Furthermore, according to the present invention, the emission of light from a light emitting element for eye sensing action is performed at appropriate timing with no use of a specified system for eliminating unwanted effects of noise signals. In operation, the emission of light for eye sensing is carried out at longer intervals for energy saving when the viewfinder is not peeped and at shorter intervals when it is in use. As the result, erroneous detection caused by noise signals derived from an inner circuitry of the camera or an exterior fluroescent lamp will be prevented and the eye sensing action will be conducted with ease and accuracy.

DETAILED DESCRIPTION OF PREFERRED EMBODIMENTS OF THE INVENTION

A first embodiment of the present invention will be described referring to the accompanying drawings.

Figure 1:
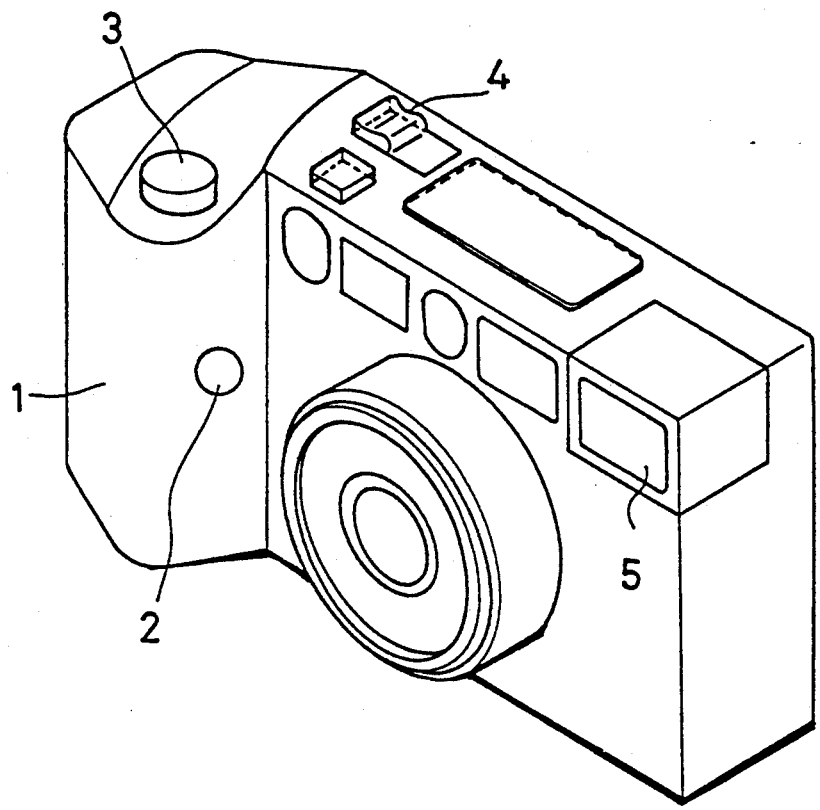
FIG. 1 is a perspective front view of a camera showing a first embodiment of the present invention.
Figure 2:
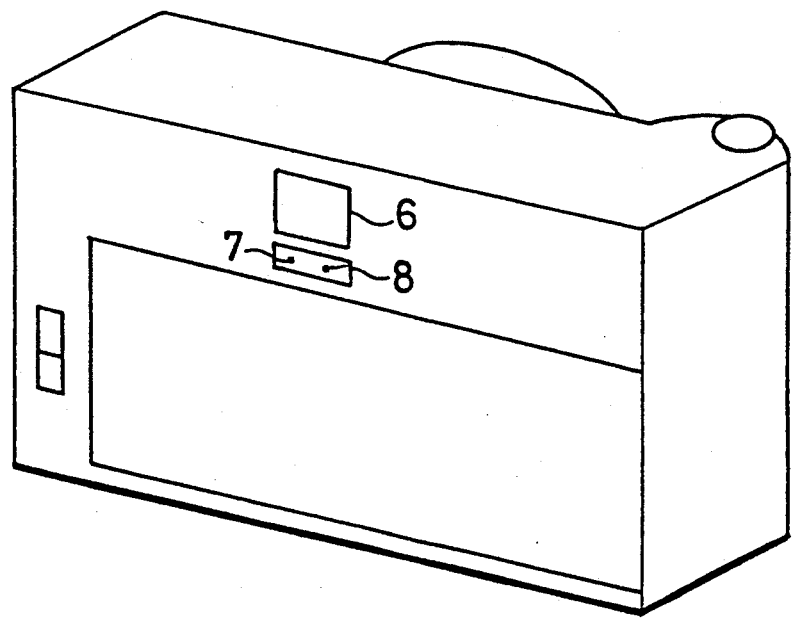
FIG. 2 is a perspective rear view of the camera.

FIGS. 1 and 2 are perspective views showing, from left front and left back respectively, a camera of the present invention. As shown in FIG. 1, denoted by the numeral 1 is a grip for holding the camera with a right hand in photographing except very particular cases. The grip 1 has a grip button-switch 2 thereon for detecting that the grip 1 is seized. Also, a two-position shutter release button 3 is provided on the top of the grip 1 for locking the distance measurement and incoming light measurement at the first position and starting exposure control at the second position. There are provided a main switch 4 for energizing the camera an a light emitting portion of an electronic flash 5.

Illustrated in FIG. 2 are a viewfinder 6, a light emitting element 7, e.g. a light emitting diode (hence, referred to as an LED hereinafter), and a photo receiving element 8, e.g. a silicon photo cell (hence, referred to as an SPC hereinafter) for detecting a light emitted from the LED 7.

Figure 3:
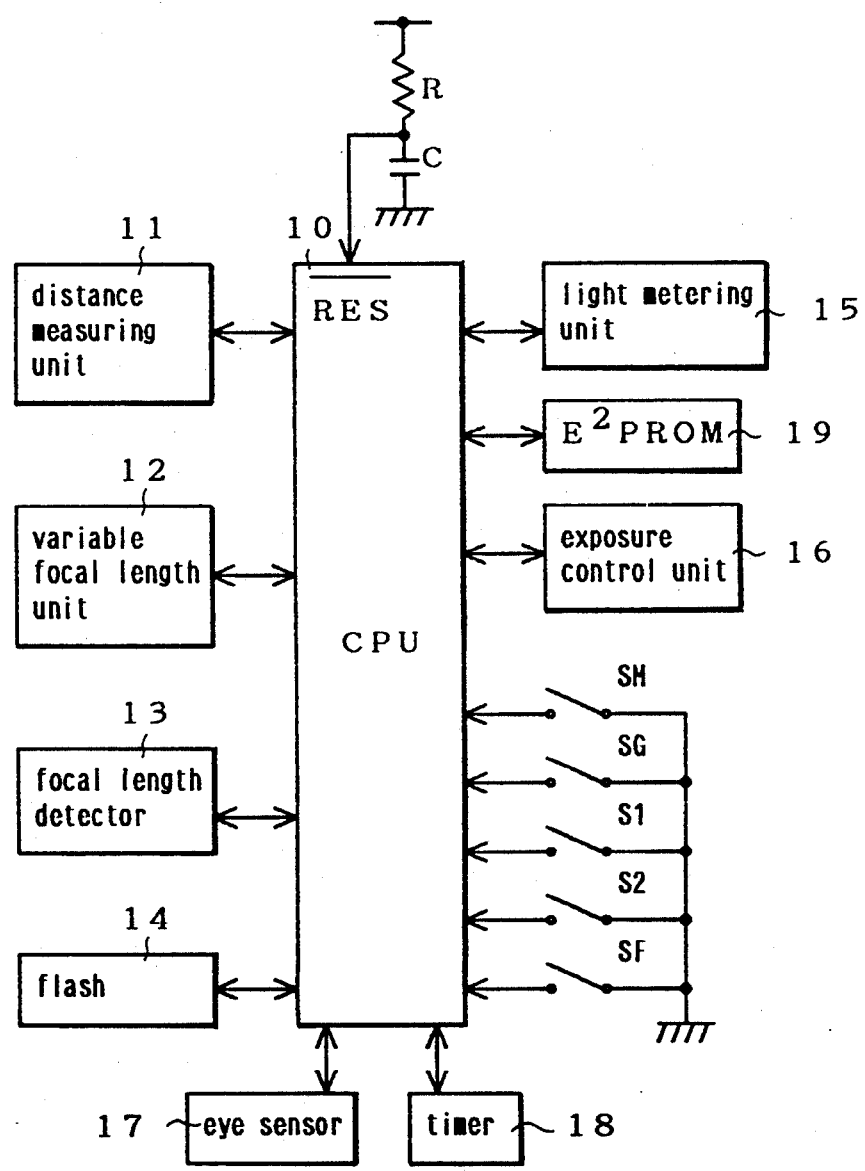
FIG. 3 is a block diagram showing a primary part of the first embodiment.

FIG. 3 is a block diagram showing the arrangement of the camera of the present invention, in which provided are a central processing unit (abbreviated to CPU) 10 for controlling the overall operation in the camera and performing arithmetic operations in APZ control, a distance measuring unit 11 for calculating the distance D to an object and outputting it to the CPU 10, a variable focal-length unit 12 for driving a zoom-lens motor for setting a focal length f to a value of APZ control calculated in the CPU 10, a focal-length detector 13 for detecting the current focal-length with e.g. a code plate during focusing operation of the focal-length controller 12 and outputting its value to the CPU 10, an electronic flash unit 14 provided with a built-in flashlight capacitor for charging the capacitor upon receiving a charge instruction signal from the CPU 10 and after the capacitor is fully charged, outputting a charge completion signal to the CPU 10, a light metering unit 15 for measuring the brightness of the object and outputting its data to the CPU 10, an exposure control unit 16 for conducting a shutter release action and a film winding action upon receiving a control signal from the CPU 10, and an eye sensor 17 consisted mainly of the LED 7 and the SPC 8 for detecting the reflected light of the LED 7. The eye sensor 17 is arranged such that the light emitted from the LED 7 is reflected on the face of the operator who intends to observe an object through the viewfinder 6 and detected by the SPC 8 within a given range of reflected light level. Also, there are provided a timer unit 18 for conducting an auto power off action which is for deenergizing the camera when specific switches have remained unactuated for a given period of time and an E²PROM 19 for holding data such as the version number of a camera control program software.

Switches in the arrangement will be explained in detail. A main switch SM is provided for energizing the camera. A grip switch SG turns on when the grip button switch 2 is pressed, thus detecting the start-up of photographing action by the operator seizing the grip 1. A lock switch S1 is provided for locking the distance measurement, light measurement, and photographing magnification and will be turned on when the shutter release button 3 shown in FIG. 1 is pressed to the first position. When the shutter release button 3 is pressed further to the second position, a switch S2 turns on for shutter release action. A flash switch SF is turned on when flash lighting is needed.

Also, a reset terminal RES is provided on the CPU 10 for resetting timers, registers and other associated components when a power source is connected.

The operation of the CPU 10 shown in FIG. 1 will be described referring to the flow charts of FIGS. 4 to 9.

Figure 4:
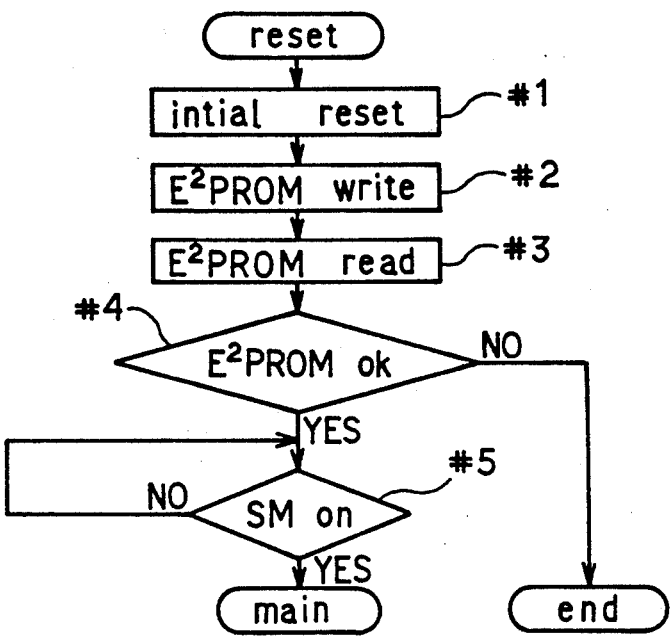
FIG. 4 is a flow chart showing the resetting action of a CPU of the first embodiment.

When the power source battery is connected, the CPU 10 commences a routine starting from "RESET" shown in FIG. 4. At Step 1, initial resetting of the timers, the registers, and the other components is executed. After the initial resetting is completed, the version number of an eligible program is written into the E²PROM 19 at Step 2. Then, the version number written into the E²PROM 19 at Step 2 is then read at Step 3 and judged at Step 4 whether it is correct or not. If the version data is incorrect, no photographing is carried out. If correct, it is then judged at Step 5 whether the main switch SM is turned on or not. If the main switch SM is on, the camera starts operating and the procedure goes to a "MAIN" routine shown in FIG. 5.

Figure 5:
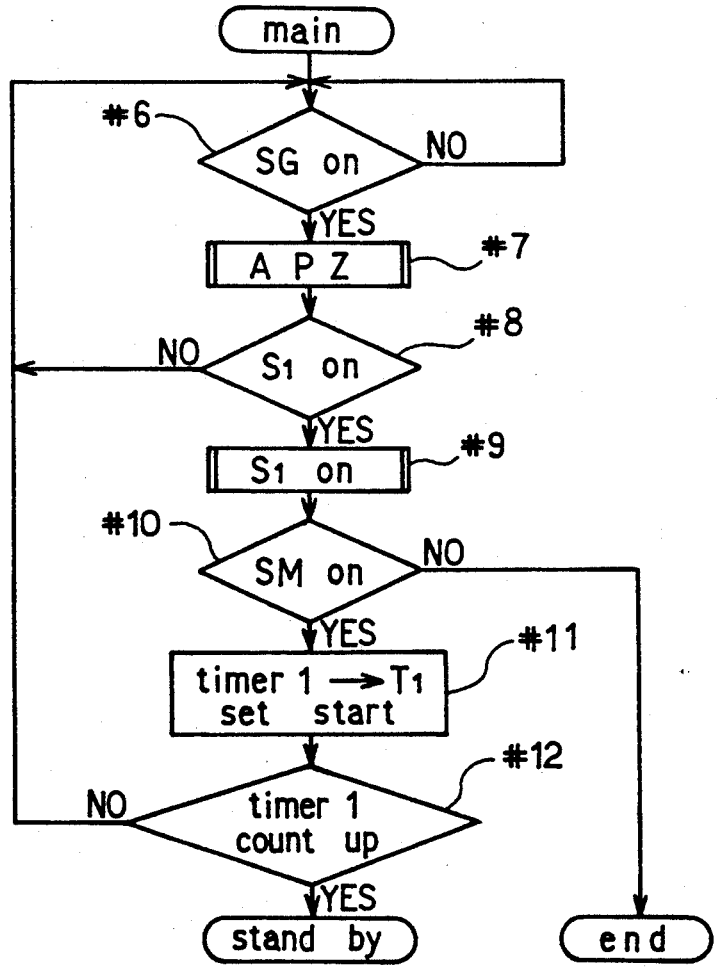
FIG. 5 is a flow chart showing a photographing action of the first embodiment.

The "MAIN" routine illustrated in FIG. 5 will be explained. At Step 6, it is judged whether the grip switch SG is on or off. When the switch SG is turned on, the procedure goes to to Step 7 of an "APZ" sub-routine. At step 8, it is judged whether the switch S1 is on or off. If off, the process from Step 6 to 7 is repeated. If the switch S1 is on, the procedure goes to Step 9 of an "S1 ON" sub-routine, described later. After the "S1 ON" sub-routine, it is judged again at Step 10 whether the main switch SM is on or off. If off, the procedure for photographing is ended. If the main switch SM remains on, a timer 1 is set to a predetermined value T1 at Step 11 and then, commenced. At Step 12, it is judged whether the timer 1 is counted up or not. The timer 1 is for APO control and if not, the procedure goes back to Step 6 for repeating the same process. When the timer is counted up, a display of counting operation is turned off and the camera remains in a standby state until either the grip switch SG or switch 1 is connected once again.

An "APZ" sub-routine will now be described referring to the flow charts of FIGS. 6 (a) and (b). This sub-routine starts when the grip switch SG is pressed. At Step 13, a register COUNT in the CPU 10 for eye sensing action is reset to zero and at Step 14, a timer 2 is activated. The timer 2 is adapted for providing interruptions at given intervals of time. At each interruption, the CPU 10 carries out an "INT" routine shown in FIG. 7. As shown in FIG. 7, the grip switch SG is judged at Step 41 whether it is on or off. If the grip switch SG is off, i.e. the grip 1 is not seized by the operator (in many cases, there is no intention of photographing), the procedure goes to Step 42 where the register COUNT is reset to zero and then, to "RETURN". The same judgment is executed at Steps 6 and 41 because between the two steps, the grip 1 itself or the grip button-switch 2 only may be released. If the switch SG is on or a photographing action is intended, the procedure goes to Step 43 where the LED 7 mounted adjacent to the viewfinder 6 as shown in FIG. 2 is activated for emission of light. The LED 7 emits a series of pulse lights for the purpose of energy saving. Reflection of the emitted light is detected by the SPC 8 and at Step 44, it is judged whether the reflected light has an intensity of more than a reference level or not. The reference level of light intensity is measured when the distance between the viewfinder 6 and the operator (more specifically, the eye of the operator) is as close as a few millimeters (e.g. 5 mm). If the reflected light exceeds the reference level, it is determined that the operator is using the viewfinder 6. If not more than the reference level, it is determined that the viewfinder 6 is not used.

When the reflected light is more than the reference level, the procedure goes to Step 45 where the register COUNT is set to the count plus one (COUNT=count+1). At Step 46, it is examined whether COUNT is less than 2 or not. If COUNT≧2, the register COUNT is set to COUNT=2 at Step 47 and the procedure advances to "RETURN". If COUNT<2, the procedure goes to "RETURN" with the register COUNT holding the value determined at Step 45. In other words, when the operator is ready for photographing with his hand on the grip 1 shown in FIG. 1 and peeping to the viewfinder 6 shown in FIG. 2, the register COUNT reads 0 at Step 13 of FIG. 6(a).

Hence, even if the reflection of a light emitted by the LED 7 has an intensity of more than the reference level, COUNT=1 is obtained at Step 45 and thus, the "INT" routine (for eye sensing action) will be finished after setting COUNT=1. Then, a timer interruption is introduced and if the reflection of the light emitted from the LED 7 remains at the intensity more than the reference level, COUNT becomes 2. As the result, Step 15 of FIG. 6(a) permits the action of APZ control to proceed. No action of the APZ control is directly triggered by the detection of a reflected light during first emission of the LED 7. This arrangement is developed, in view of the unavoidable occurrence of noise, for prevention of unwanted lens zooming movement during the framing. If the reflected light is found less than the reference level at Step 44, the procedure goes to Step 48 where the register COUNT is set to the count minus one (COUNT=count−1). At Step 49, it is examined whether the value of the register COUNT given at Step 48 is more than 0 or not. If not more than 0, the resister COUNT is set to COUNT=0 at Step 50. If more than 0, the procedure returns with the register COUNT holding the value given at Step 48. The operation across Steps 44, 48, 49, and 50 will be explained in more detail according to a practice of photographing action. When the viewfinder 6 remains unused prior to photographing, the register COUNT reads 0 and no action of the APZ control is executed. If the eye of the operator moves away from the viewfinder 6 during action of the APZ control, the intensity of the reflected light is decreased to below the reference level as detected at Step 44. When the reflected light intensity is decreased, the action of the APZ control does not stop immediately. It will stop only when the reflection of the succeeding light emitted by the LED 7 is lowered in intensity to less than the reference level. This arrangement is made for the same purpose of elimination of noise related error action as carried out in Steps 45 to 47.

At Step 15 of the flow chart shown in FIG. 6(a), it is examined whether the register COUNT reads 2 or not. When COUNT=2 is obtained (i.e. it is judged that the viewfinder 6 is used), the procedure goes to Step 16 where a timer 3 is reset and commenced (at t=0). The timer 3 as well as the timer 2 may be any one of built-in timers arranged in the CPU 10. Then, the measurement of object distance and light intensity on the object is executed at Step 17 by known manners using both the distance and light measurement units 11 and 15. Focusing or focal-length control is conducted at Step 18 and the object distance $D_T$ is determined at Step 19.

At Step 20, it is examined whether the counting action of the timer 3 which started at Step 16 have taken a given period of time (0.5 second in this embodiment) or not. If less than 0.5 second, the procedure goes to Step 17 and repeats Steps 17 to 19. If the period exceeds 0.5 second, it is examined at Step 21 whether a longer period of time (1 second in the embodiment) elapsed or not. If not (0.5≦t<1), it is examined at Step 22 whether a change in the object distance $D_T$ falls within a given limit range. If more than the limit range, it is judged that the framing of the object is on the way and the procedure goes to Step 17 for repeating the sequence from Step 7 to 21. If it is judged that the framing of the object has been completed with the change in the object distance $D_T$ remaining within the limit range or the counting action of the timer 3 took more than 1 second at Step 21, the zooming action starts at Step 23.

In brief, such a series of actions controlled by the timer 3 are conducted for preparation prior to the zooming action. Within 0.5 second after detection of the use of the viewfinder, the zooming action is prohibited. From 0.5 to 1 second, the zooming action can be permitted only if the object distance $D_T$ stays in a limit range. After one second elapsed, the zooming action can start regardless of the object distance $D_T$. The continuous activation of the timer 3 from Step 16 to 22 is for the purpose of preventing the start of inadvertent zooming action during the framing and receiving no unwanted effects of noises.

When the zooming action starts, the focal length $f_T$ is calculated at Step 23 corresponding to a magnification $\beta_T$ determined by the program line of APZ and the object distance $D_T$ given at Step 18. After $f_T$ is given, it is examined at Step 24 whether COUNT=0 is set or not. If COUNT=0, i.e. it is examined that the viewfinder 6 is not peeped, the zooming action is ceased and the procedure returns. If COUNT is not zero, it is judged at Step 26 whether the main switch SM is on or off. If off, the procedure goes to Step 27 where the zooming action is canceled prior to end of the procedure. The check for COUNT=0 at Step 24 is needed because of the following reason. Even when COUNT=2 has been established after the "INT" routine, a series of the interruption actions are continuously carried out at regular intervals during the operation from Step 16 to 23. Accordingly, at Step 24, it is need to examine whether COUNT=0 is set or not by the regular interruption.

Also, during the operation from Step 16 to 23, by the regular interruption, the check at Step 44 is NO (i.e. the intensity of the reflected light is less than the reference level). In this case, as COUNT=2 has been established by the preceding interruption, COUNT becomes 1 at Step 48. Thus, it is judged NO at Step 49 and the procedure returns with COUNT=1. At the time, the operation from Step 16 to 23 is triggered by the preceding interruption and at Step 24, COUNT=0 is denied. As the result, the procedure advances to Step 26 even if the reflected light intensity is lower than the reference level. When the procedure returns with COUNT=1, the succeeding interruption produces COUNT=0 at Step 48. The procedure then returns through Steps 49 and 50. As understood, the procedure which has once returned to Step 24 by a previous interruption is moved from Step 39 back to Step 24 for waiting for the closing of the switch S1. Then, it is judged at Step 24 whether COUNT=0 is established or not. If COUNT=0, the procedure returns through Step 25 thus producing no error action.

When the switch SM is on, it is judged at Step 28 whether the switch S1 is on or off. If the switch S1 is disconnected (or off), the current focal length $f_N$ is calculated by the detector 13 shown in FIG. 3 and at Step 30, compared with the focal length $f_T$ calculated at Step 23. If two values are not identical, the zooming action starts for correction and the procedure goes back to Step 24 and repeats the operation from Step 24 to 30. If the switch S1 is on at Step 28, the procedure proceeds to the "S1 ON" routine which will be descried later. If $f_N=f_T$ at Step 30, the zooming action is stopped at Step 32. When $f_N=f_T$ has been established before the zooming action, no zooming action will be needed.

Figure 8:
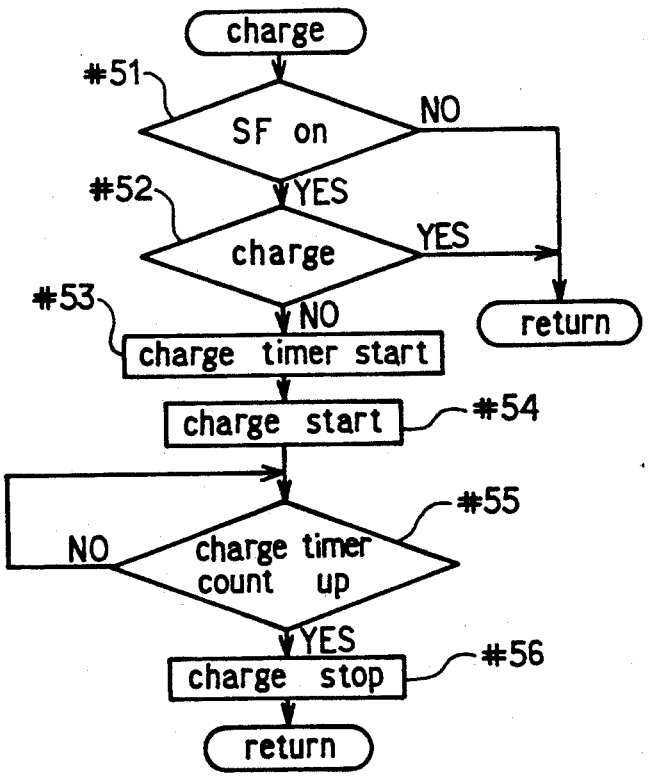
FIG. 8 is a flow chart showing a charging action to a flash unit.

After the zooming action stops, flash charging with the flash unit 14 is carried out at Step 33. FIG. 8 illustrates a routine of charging of the flash 5. The routine starts with Step 51 where it is judged the flash switch SF is on or off. If the flash switch SF is off, no charging is executed and the procedure returns. If on, it is judged at Step 52 whether the capacitor for flash charging is fully charged or not. If yes, the procedure returns at once. If not, a timer for charging is started at Step 53. The charging timer is set for so-called intermittent charging for a given time (of e.g. 250 ms). After the charging timer is started charging starts at Step 54. Then, it is judged at Step 55 whether the charging timer is counted up or not. If yes, the charging is stopped and the procedure returns.

Figure 6:
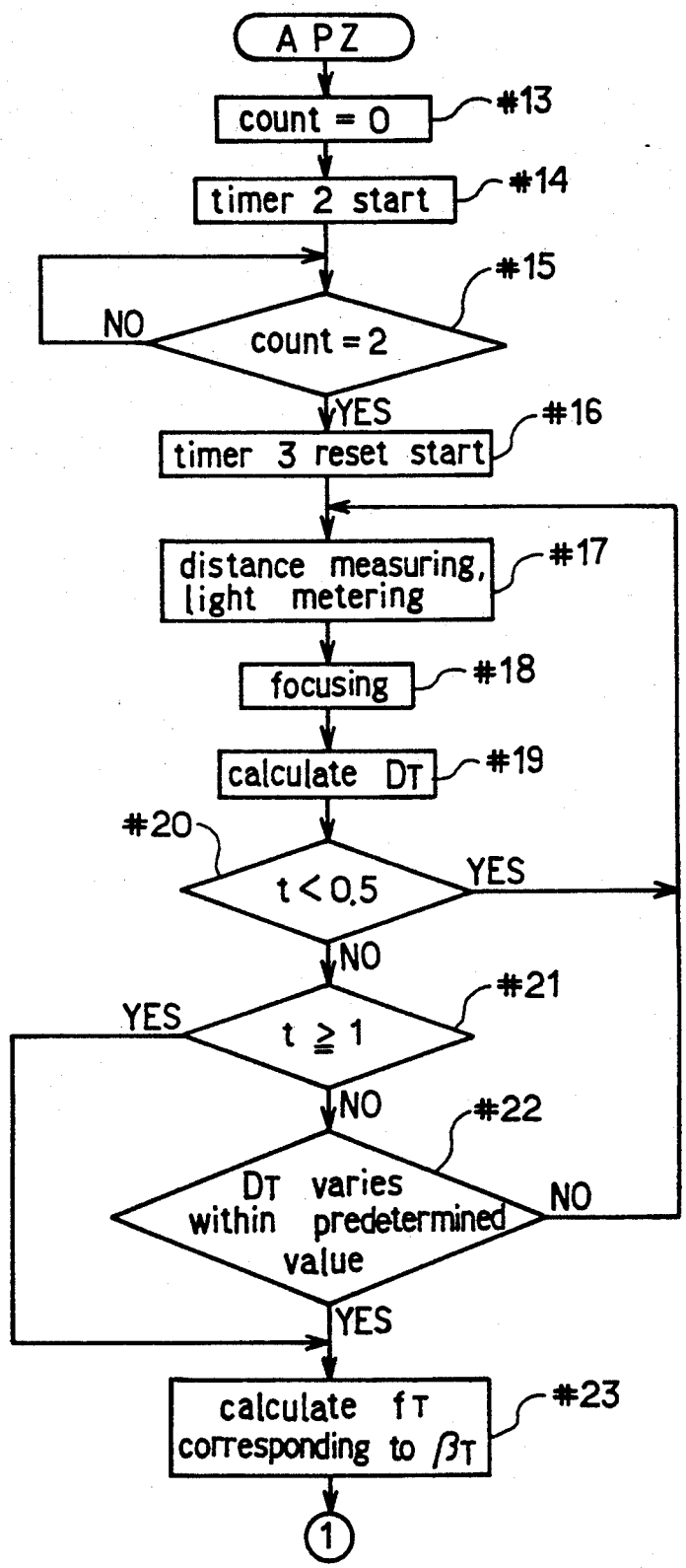
FIGS. 6(a) and 6(b) are flow charts showing an APZ action of the first embodiment.
Figure 7:
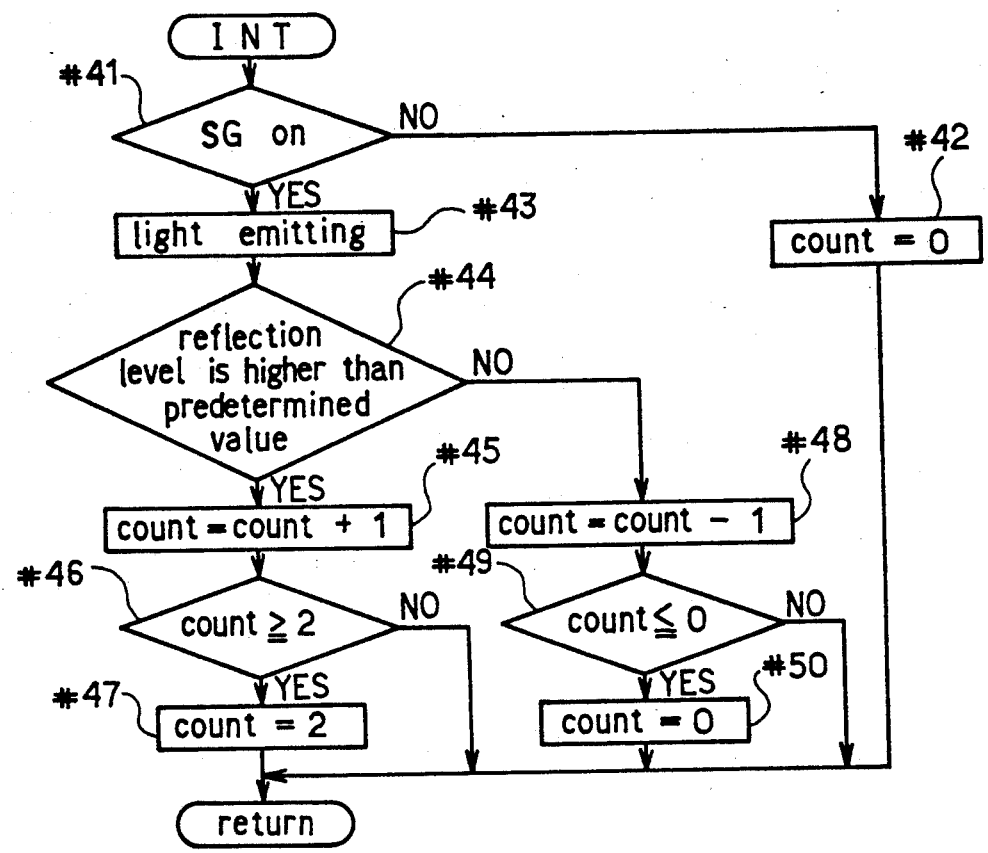
FIG. 7 is a flow chart showing an eye sensing action.

For compensation for a change in the framing during the charging action, the measurement of object distance and light intensity, the focusing, and the calculation of the object distance $D_T$ are carried out once again at Steps 34 to 36 as shown in FIGS. 6 (a) and (b). At Step 37, the object distance $D_T$ calculated at Step 36 is compared with the preceding object distance $D_T$. If a difference between the two values exceeds a predetermined value, it is judged that the framing is varied and the procedure goes back to Step 23 for repeating the operation from Step 23 to 36. If the difference is less than the value, it is judged that no framing change is made and the procedure goes to Step 38 where the timer 1 for APO action is set to a given value $T_2$ and started. The operation from Step 24 to 39 continues until it is judged at Step 39 that the timer 1 has counted up. After the timer 1 counted up, the data of object distance and light intensity is cleared off and when COUNT=0 or the viewfinder is unoccupied, the procedure proceeds to the "MAIN" routine.

According to the embodiment of the present invention, the charging to a flash in the APZ mode is executed during holding of the framing after completion of the zooming action. Hence, when the two switches S1 and S2 are activated to start an exposure action before the charging is completed, a standby period (or an uncharge lock time) to the exposure action will be shortened by corresponding amount of charging during the framing.

Also, the timer 1 for APO action is activated during the APZ mode so that the zooming action of the APZ mode can be canceled after a given time when it is not needed (i.e. the object stays at a stationary position). As the result, no surplus action in the distance measurement is carried out and thus, unnecessary consumption of electric energy will be prevented.

During the APZ action in the APO mode, the eye sensing action is maintained. When the eye of the operator is departed from the viewfinder and returned back to the same, the photographing action restarts.

Figure 9:
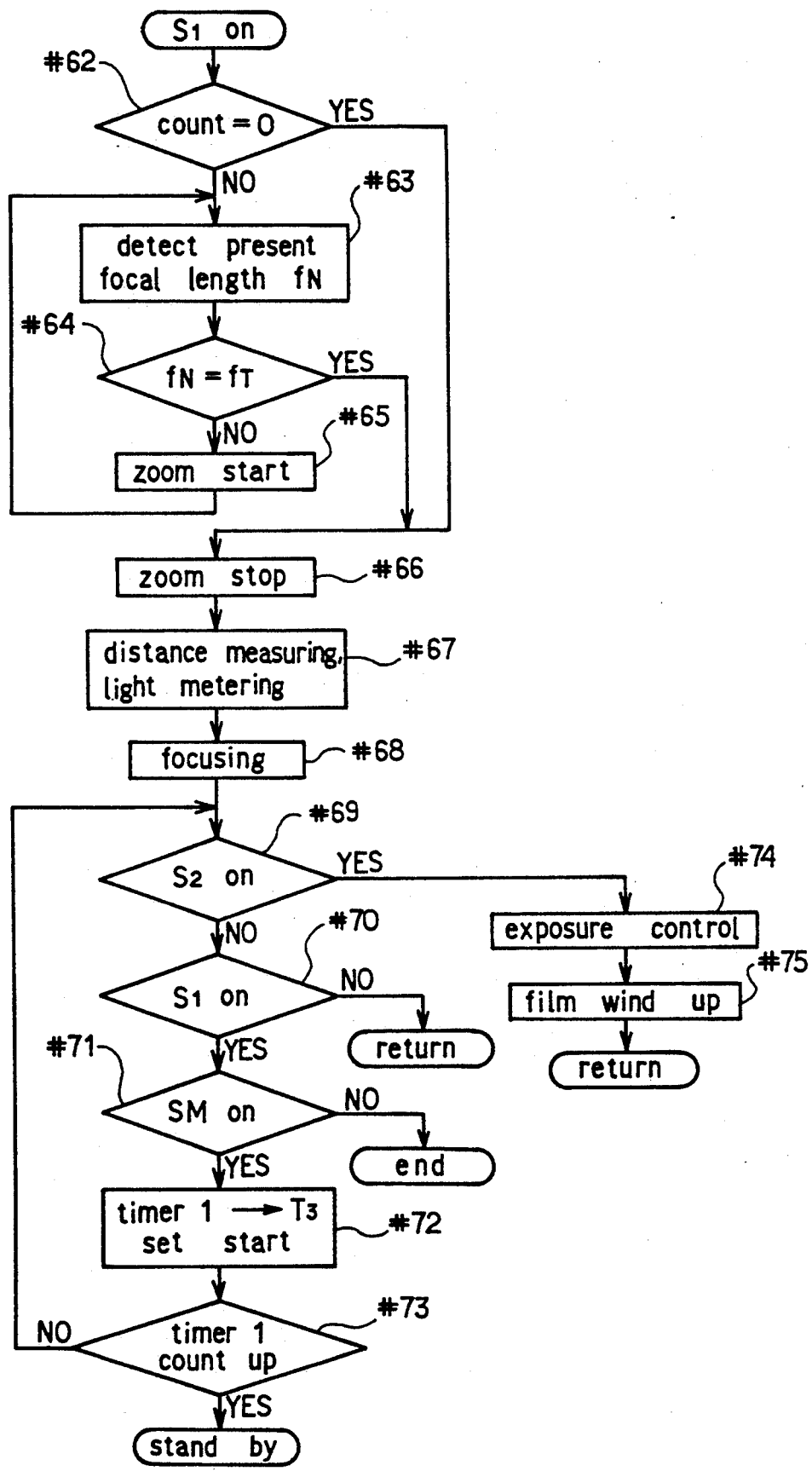
FIG. 9 is a flow chart showing a shutter release action.

Referring to FIG. 9, the "S1 ON" routine with the switche S1 turned on will be explained. At Step 62, it is judged whether the register COUNT reads 0 or not. If COUNT≠0, i.e. the viewfinder is occupied, the current focal length $f_N$ is measured at Step 63. At Step 64, the current focal length $f_N$ is then compared with the previous focal length $f_T$ caluclated at Step 23. If $f_N=f_t$ is not given, the zooming action is triggered at Step 65 for setting the focal length to $f_T$. When the switch S1 is turned on during the zooming action, the zooming action is continued until the focal length becomes equal to $f_N$. After $f_N=f_T$ is established, the zooming action is ceased to Step 66 and the procedure goes to Step 67.

If COUNT=0 is established at Step 62, the zooming action is stopped at the current focal length and the procedure goes to Step 67 where the measurement of distance and light intensity is repeated for confirmation. Then the focusing is carried out once more at Step 68.

At Step 69, it is judged whether the exposure control switch S2 is turned on or off. If on, the exposure control is executed at Step 74. After a film is wound at Step 75, the procedure returns. If the switch S2 is off, it is judged at Step 70 whether the switch S1 is turned on or off. If off, the procedure returns. If the switch S1 remains on state, it is judged at Step 71 whether the main which switch SM is turned on or off. If the main switch SM is off, the photographing is finished. If on, the timer 1 is set to $T_3$ at Step 72 and started. At Step 73, it is judged whether the timer 1 counted up or not. If counting continues, the procedure goes to Step 69 and the operation between STeps 69 and 75 is repeated. After the timer 1 counted up, the standby state is set up and remains until the switch S1 is turned on again.

According to the embodiment of the present invention, the timer for APO control is kept activated during on state of the switch S1. As the result, unneccessary consumption of electrical energy required for focus locking action during a considerable length of time will be prevented.

Figure 10:
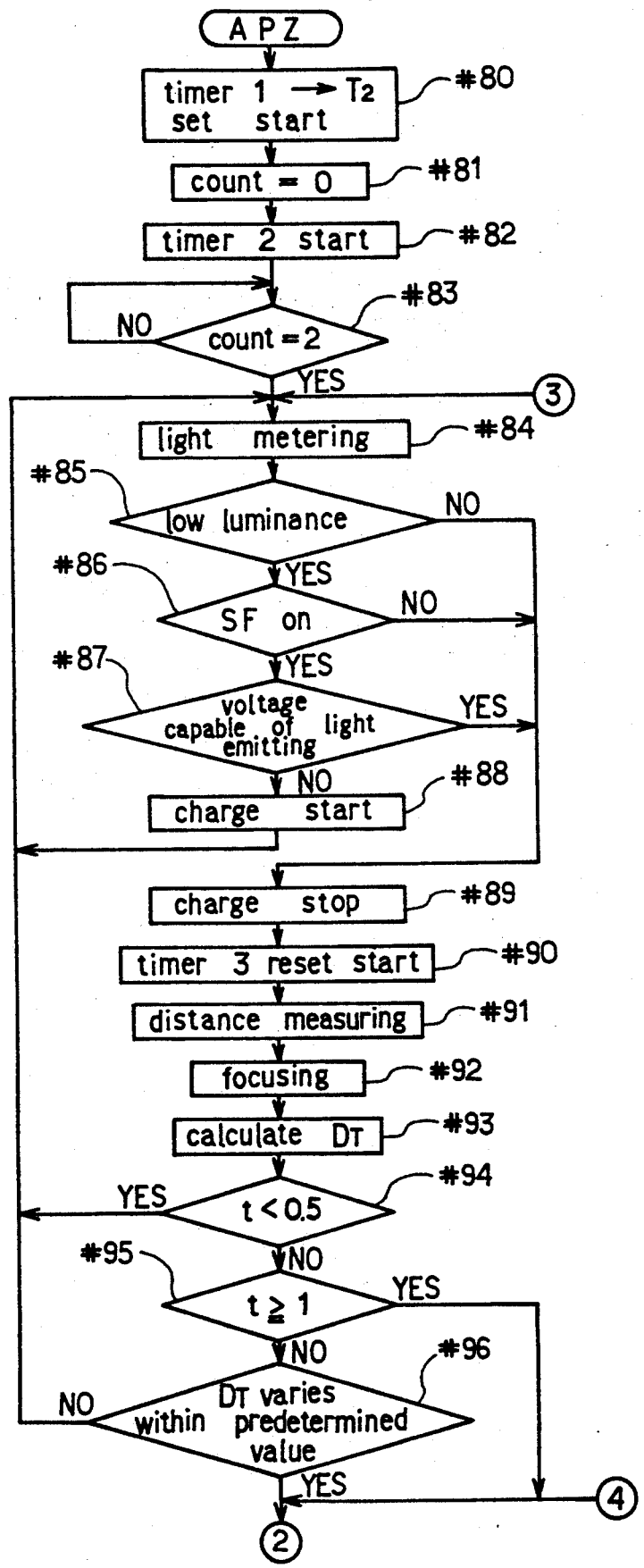
FIGS. 10 (a) and (b) are flow charts showing another procedure of the APZ action.
Figure 10:
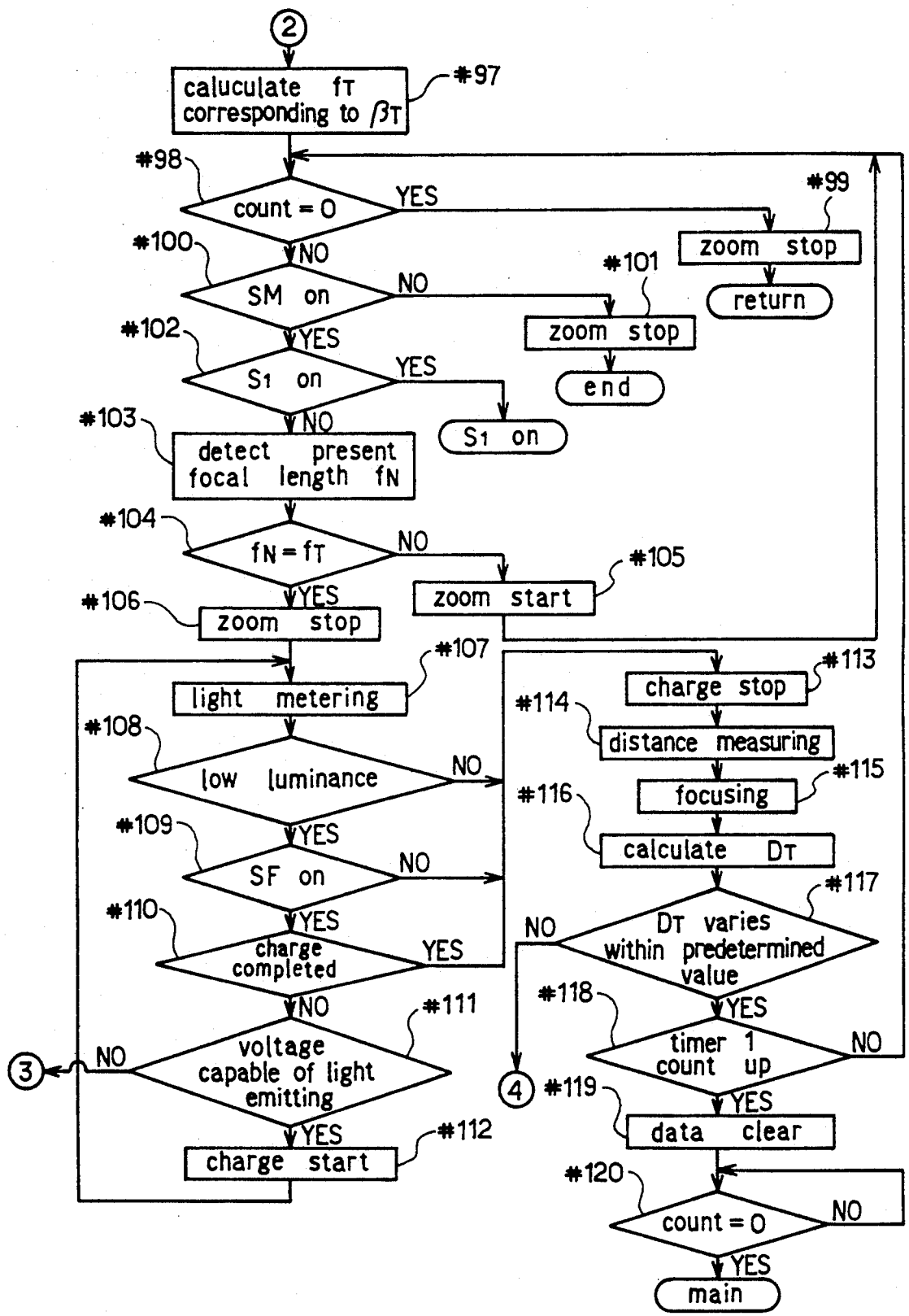

FIGS. 10 (a) and (b) are flow charts showing for switching between an APZ priority action and a charge of flash by priority.

It starts with setting of the APO timer 1 to $T_2$. This step is needed for carrying out the APZ action within a predetermined period thus minimizing consumption of electrical energy. When the viewfinder is occupied and COUNT=2 is established, the measurement of light intensity on the object is executed at Step 84 as shown in FIG. 6. It is then judged at Step 85 whether the measured intensity of luminance is low or not. If not low, the procedure goes to Step 89. If low, it is judged at Step 86 whether the flash switch SF is on or off. If off, it is judged that no flash lighting is conducted and the procedure goes to Step 89. If the flash switch SF is on, it is judged at Step 87 whether the capacitor for flash lighting is charged up to a voltage as high as capable for emission of flash light or not. It yes, the procedure goes to Step 89. If not, the charging starts at Step 88 and then, the procedure returns back to Step 84. The procedure advances to Step 89 when the intensity of luminance is increased during the charging, the flash switch SF is turned off, or the charging is proceeded to a flash light emittable voltage. At Step 89, the charging is interrrupted and then, the timer 3 is reset and started at Step 90. The measurement of object distance is carried out at Step 91 and followed by the operation from Step 92 to 106 identical to that of Steps 18 to 32 shown in FIGS. 6 (a) and (b). Then, the APZ action is stopped at Step 106, the measurement of light intensity is repeated at Step 107, the measured intensity of luminance is judged at Step 108 if it is too low or not, and the flash switch SF is checked at Step 109. At Step 110, it is judged whether the charging to the flash 5 is completed or not. If not, it is judged at Step 111 whether the charging is proceeded up to a flash light emittable voltage or not. If not, the procedure returns back to Step 84. if yes, charging is commenced at Step 112.

Figure 6B:
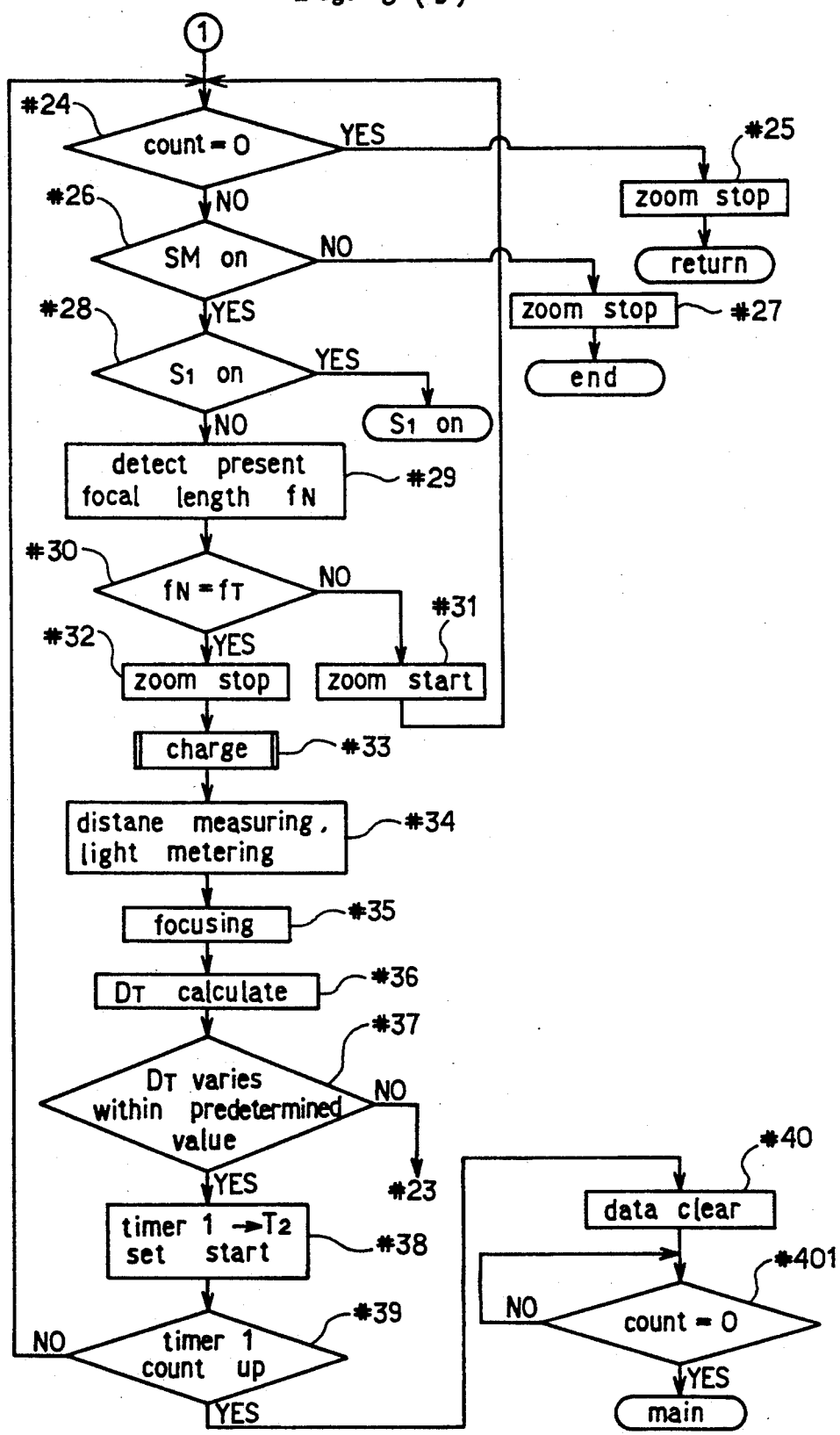

After the charging action is finished at Step 113, the measurement of object distance is carried out at Step 114. The following steps are identical to those after Step 36 shown in FIG. 6(b).

As understood referring to FIG. 10, charging priority is given for producing a flash light emittable voltage when flash lighting is wanted. The measurement of light intensity can be executed during the charging, and if flash lighting action is no need, the charging action is ceased. More particularly, the APZ action will be carried out after the flash light emittable voltage is prepared. Then, when the shutter release button is pressed, no uncharge lock action will be involved. After that, the charging can be proceeded to have a charging completion level while no zooming action is conducted.

Figure 11:
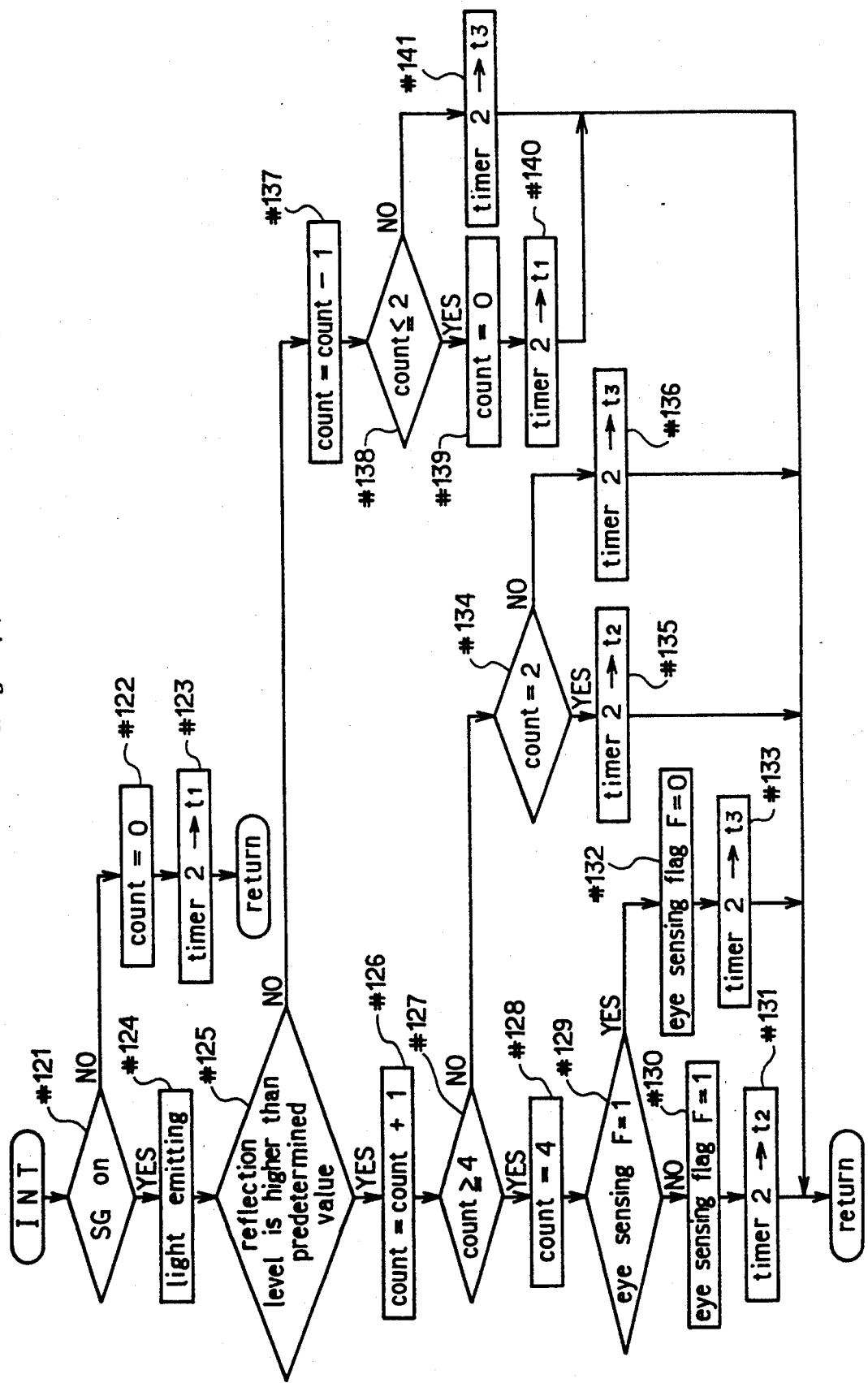
FIG. 11 is a flow chart showing another procedure of the eye sensing action.
Figure 12:
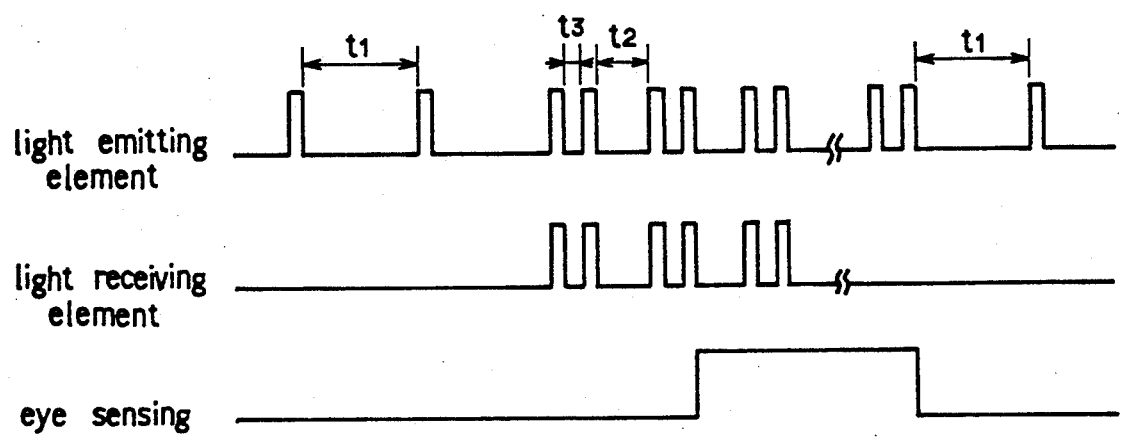
FIG. 12 is a timing chart of the eye sensing action.

FIGS. 11 and 12 are a flow chart and a time chart respectively for eye sensing action at higher accuracy. A series of the eye sensing actions are triggered out at equal intervals by the timer 2 as shown in FIGS. 6 and 7. FIG. 11 illustrates the emission of light for eye sensing being executed at shorter intervals when the intensity of the reflected light is higher than the reference level. This action will be explained in more detail referring to FIG. 11.

When the grip switch SG is not pressed by the operator of the camera, COUNT=0 is set at Step 122. Then, $t_1$ is set at the timer 2 by being reset the control of the LED 7 at Step 123 for emission of light at intervals of $t_1$ and the procedure returns.

When the grip switch SG is on, the LED 7 emits light at Step 124. If the intensity of an incoming light (or a reflected light) detected by the SPC 8 is higher than the reference level as judged at Step 125, the register COUNT is set to COUNT+1 at Step 126. It is then judged at Step 127 whether COUNT≧4 is established or not. At Step 46 shown in FIG. 7, it is judged whether COUNT≧2 is established or not and when the reflected light intensity becomes higher than the reference level two times, the APZ action is commenced. In FIG. 11, when that becomes four times, the APZ action is commenced. If COUNT≧4 is not given at Step 127, it is judged at Step 134 whether COUNT equals 2 or not. When the reflected light intensity is once detected higher than the reference level, COUNT=1 is found and the procedure goes to Step 136. At Step 136, the timer 2 is set to $t_3$ ($t_1 > t_3$) for interruption action and the procedure returns. After a period of $t_3$, the interruption is given and if the reflected light intensity is higher than the reference level, COUNT=2 is established. Accordingly, after the examination at Steps 127 and 134, the procedure goes to Step 135 where the timer 2 is set to $t_2$ ($t_1 < t_2 < t_3$).

Because of the following reason, the interruption action by the timer 2 is ranked to three different levels. When the viewfinder 6 is not occupied by the operator who holds the grip 1, the emission of light for eye sensing is made at longer intervals of $t_1$ for energy saving. Once the intensity of the reflected light is detected higher than the reference level, the emission of light at shorter intervals of $t_3$ is carried out for avoiding unwanted effects of noises. The noises include noise signals tranferred from the camera and derived from external fluorescent lamps. As a fluorescent lamp is lit corresponding to frequency of AC power source (about 50 or 60 Hz), the time $t_3$ is arranged shorter than the frequency (period) of fluorescent light. When another interruption action if given after the duration of $t_3$ and the reflected light intensity of more than the reference level is detected, it is judged that no noise is involved and the period for intermittent emission of light is shifted to $t_2$.

As shown in FIG. 11, when the reflected light intensity is measured more than the reference level four consecutive times, COUNT=4 is given at Step 126. After examination at Step 127, the procedure goes to Step 128 where COUNT=4 is determined. It is then examined at Step 129 whether a flag for eye sensing is set 1 or not. The flag is assigned as 0 at the initial eye sensing action and the procedure goes to Step 130 where the flag is set to 1. Then, the timer 2 is set to $t_2$ at Step 131 and the procedure returns. At the succeeding eye sensing, the flag is 1 and the procedure goes from Step 129 to 132. The flag is set to 0 at Step 132 and the timer 2 is set to $t_3$ at Step 133 and the procedure returns.

When the reflected light intensity is detected less than the reference level at Step 125, the resister COUNT is set at Step 137 to COUNT−1 by the same manner as shown in FIG. 7. Then, it is judged at Step 138 whether COUNT≦2 is established or not. If not, the timer 2 is set to $t_3$ at Step 141 and the procedure returns. If COUNT≦2, COUNT=0 is given at Step 139. Then, the timer 2 is set to $t_1$ at Step 140 and the procedure returns.

As shown in FIG. 12, the LED 7 emits a series of lights at $t_1$ intervals for eye sensing until the refleceted light intensity becomes higher than the reference level. Once the reflected light intensity is detected higher than the reference level, the emission of light at intervals of $t_2$ and $t_3$ is executed alternately. When the reflected light intensity is detected higher than the reference level four consecutive times, it is judged that the viewfinder is occupied and the APZ action starts. During the APZ action and photographing, the emission of light from the LED 7 remains proceeded at intervals of $t_2$ and $t_3$ alternately. If the reflected light intensity is detected lower than the reference level two consecutive times, it is judged that the viewfinder is not used and the APZ action is ceased.

Although the APZ action stops when the reflected light intensity is detected less than the reference level two consecutive times as illustrated in FIG. 11, it may be stopped when a lower intensity than the reference level is measured four consecutive times similar to the start of the APZ action.

A second embodiment of the present invention will now be described in the form of an eye sensor camera referring to FIGS. 13 to 18.

Figure 13:
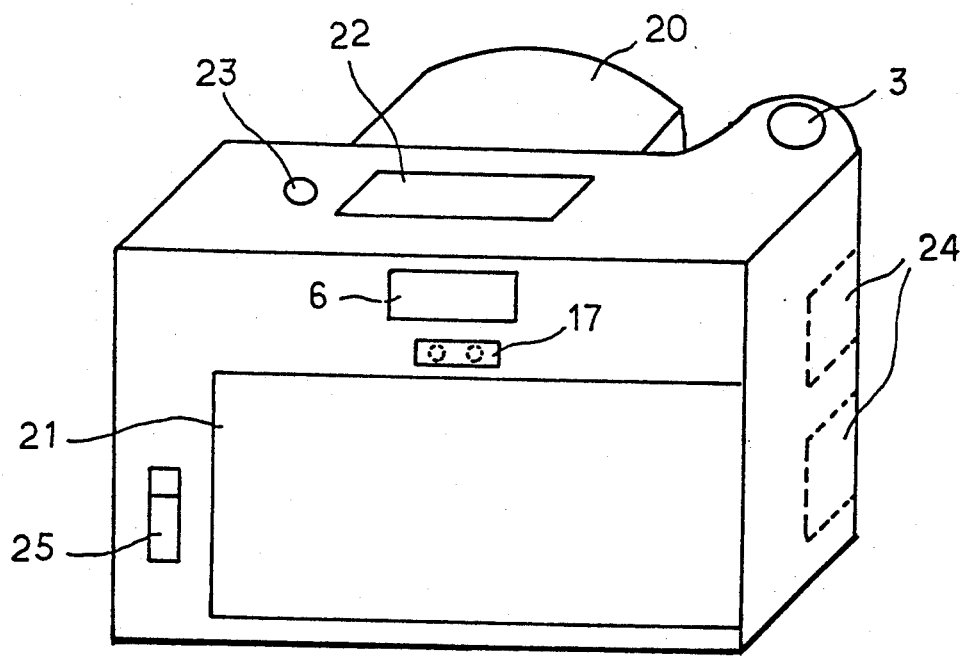
FIG. 13 is a perspective rear view of a camera with an eye sensing control showing a second embodiment of the present invention.

FIG. 13 shows an external view of the rear of the camera of the present invention.

Illustrated in FIG. 13 are a lens barrel 20 mounted to the front of a camera body and containing a group of lenses arranged for auto-focusing action, an openable rear cover 21 for loading a film, a two-position shutter release button 3 for actuating at the first stroke position a distance and light metering switch S1 to start the measurement of object distance and light intensity on the object and at the second stroke position a release switch S2 to release the shutter, an LCD panel 22 for display of information about camera settings in use. A flash lighting button 23 for activating a flash switch SF for setting a flash photographing mode, an eye sensor 17 comprising an LED 7 and an SPC 8 and mounted beneath a viewfinder 6 for detecting that the operator of the camera intends to view through the viewfinder 6, a grip detector 24 containing a grip switch SG for detecting that a grip portion of the camera is seized by the operator, and a rear cover opening knob 25 incorporating a rear hatch switch SRC. An electronic flash, not shown in FIG. 13, may be of built-in type or common separate type.

Figure 14:
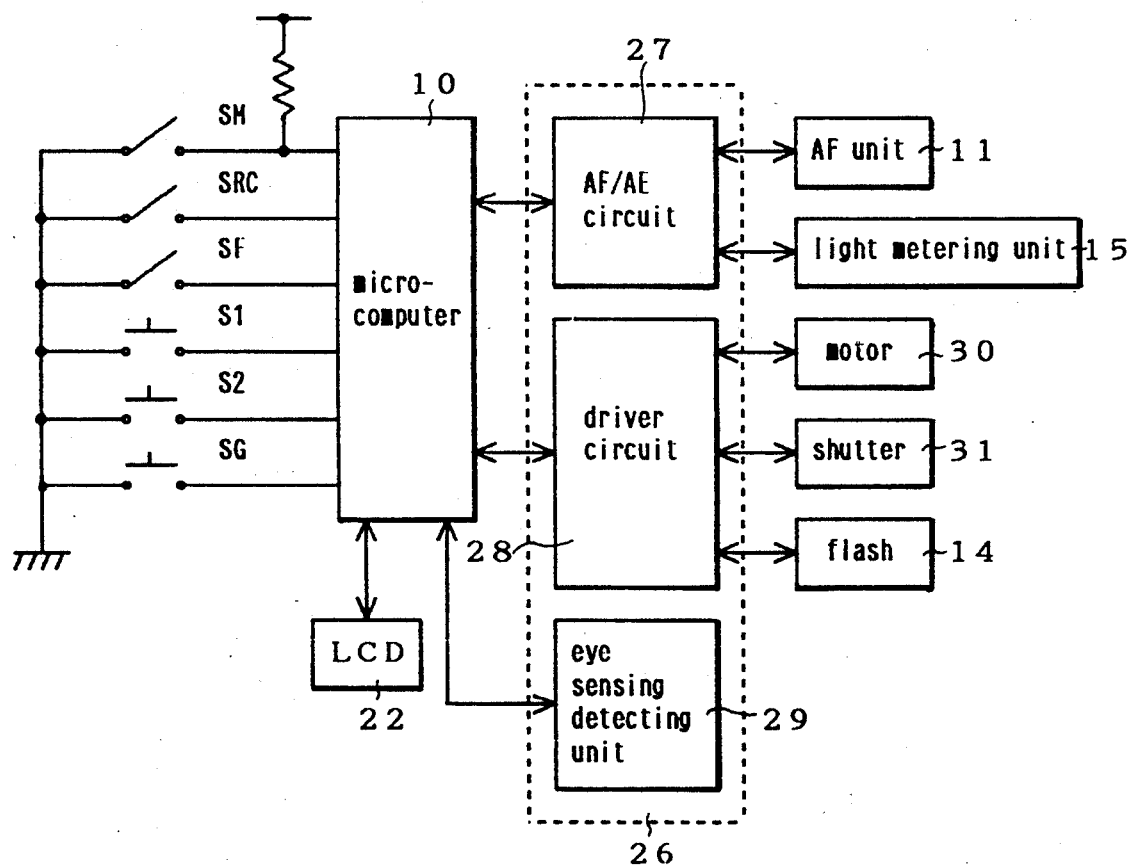
FIG. 14 is a block diagram showing a control circuit of the camera.

FIG. 14 is a block diagram showing a control circuit of the camera of the present invention. There is provided a microcomputer 10 containing a ROM and a RAM. An interface 26 comprises a focus/light metering circuit 27 (referred to as AF/AE circuit), a driver circuit 28, and an eye sensing circuit 29 for activating corresponding units upon receiving instruction signals from the microcomputer 10. The AF/AE circuit 27 is arranged to activate both an AF unit 11 and a light metering unit 15 which in turn transfers AF and light metering data to the microcomputer 10. The driver circuit 28 activates the a motor 30 for AF control, a shutter 31, and the electronic flash 14. Also, the flash 14 has a capacitor for flash lighting, a detecting circuit for detecting a charging voltage to the flash lighting capacitor, and a charging circuit for charging the capacitor which all are not shown and controlled by the microcomputer 10.

In operation, the eye sensing circuit 29 detects that the viewfinder 6 shown in FIG. 13 is occupied and transfers a detected signal to the microcomputer 10. The LCD panel 22 is driven by the microcomputer 10. A group of switches connected to the microcomputer 10 output LOW signals when closed (or turned on) and HIGH signals when opened (or turned off) to the microcomputer 10. When a main switch SM is on, the photographing is allowed. When it is off, initial loading only is permitted. When the rear cover switch. SRC is on, the rear cover stays opened and when off, closed.

When the flash switch SF is on, the flash can be operative. When it is off, the flash is inoperative. Both the light and distance metering switch S1 and the shutter release switch S2 are linked with the shutter release button 3 and will be turned on at the first and second stroke positions of the shutter release button 3 respectively. The grip switch SG is turned on when the grip portion of the camera is seized by the hand of the operator.

A sequence of camera control action with the microcomputer 10 will be described referring to the flow chart of FIG. 17.

When the camera is energized, the microcomputer 10 is reset and starts the control sequence. At Step 200, the RAM is cleared off and initial setting is made. It is then checked at Step 201 whether the rear cover 21 is closed or not by using the rear cover switch SRC. If the rear cover switch SRC is shifted from on (open) to off (close) position, the procedure goes to Step 202 and otherwise, to Step 203. At Step 202, the initial loading of a film is executed for providing a standby state. After the film loading, the procedure returns to Step 201.

The main switch SM is checked at Step 203 for connection. When the main switch SM is on, the procedure proceeds to Step 204 and if not, returns to Step 201. At Step 204, it is judged whether an SREW switch, not shown, is on or off. If the SREW switch shifts from off to on, the procedure goes to Step 205 and otherwise, to Step 206 for further switch check. The film is rewound at Step 205 and after rewinding, the procedure returns to Step 201.

The grip switch SG is checked at Step 206. When the grip switch SG is on, the procedure goes to Step 207 and otherwise, returns to Step 201. At Step 207, it is judged whether the viewfinder 6 is occupied or not, i.e. the eye sensing action is executed using the eye sensor 17. This particular process will be explained later in more detail. After the eye sensing is completed, the procedure goes to Step 208.

The light and distance metering switch S1 is checked at Step 208. When the switch S1 shifts from off to on position, the procedure goes to Step 209 and otherwise, to Step 212. At Step 209, both AF and AE actions are carried out and the stop position of a lens unit and the data for shutter control are obtained. Then, the procedure goes to Step 210 where the release switch S2 is checked. When the release switch S2 shifts from off to on position, the procedure goes to Step 211 for release control action and otherwise, the action at step 210 is repeated.

The release control action at Step 211 includes lens forward movement, shutter control, and film advance motion. After the release control is completed, the procedure returns to Step 201.

The flash switch SF is checked at Step 212. If the flash switch SF is on, the procedure goes to Step 213 and if off, returns to Step 201. At Step 213, it is judged whether the charging is completed or not through reading a voltage of the flash lighting capacitor in the flash 14. If not, the procedure goes to step 214 for charging and if yes, returns to step 201.

An eye sensing system will now be explained.

Figure 15:
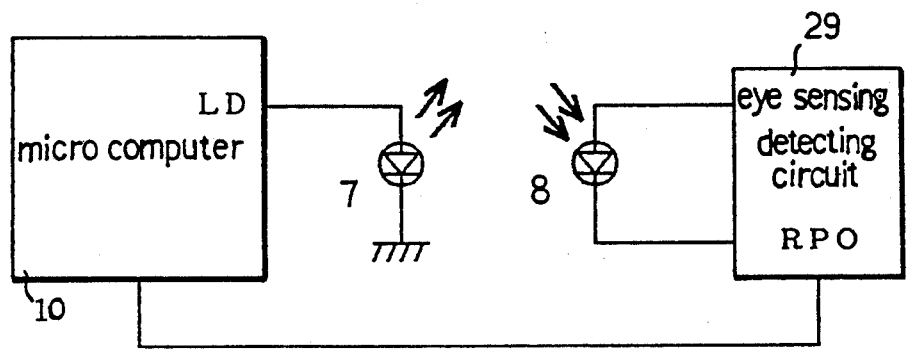
FIG. 15 is a block diagram showing an eye sensing circuit.

FIG. 15 is a block diagram showing the eye sensing system associated with the second embodiment, which comprises the eye sensing circuit 29 controlled by the microcomputer 10, the LED 7, and the SPC 8. As understood, the LED 7 and the SPC 8 constitute the eye sensor 17 in combination. A siganl LD (see FIG. 16) from the microcomputer 10 is for control the LED 7. When the signal LD is at a low state, the LED 7 is turned off and when at a high state, turned on. A signal RPO (see FIG. 16) from the eye sensing circuit 29 which carries eye sensing data is fed to the microcomputer 10 indicating at the low state that the viewfinder is occupied and at the high state that it is not.

Figure 16:
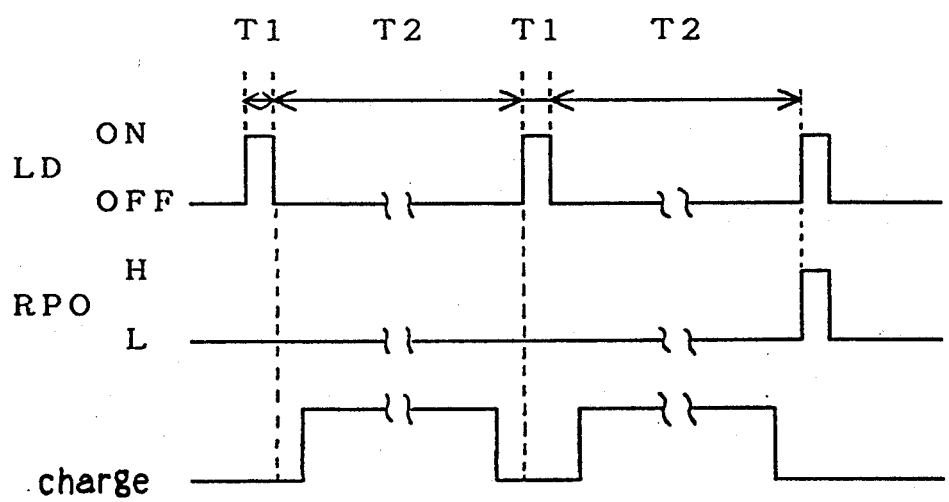
FIG. 16 is a time chart showing an action of the eye sensing circuit.

A control with the LED 7 will schematically be described referring to the time chart of FIG. 16. While the LED 7 is activated for a given time of T1 (e.g. 100 micro seconds), it is monitored with the microcomputer 10 whether the signal RPO shifts to the high state or not. If not, a standby period of T2 (e.g. 300 milliseconds) is introduced. After the T2 period, the LED 7 is activated again for the T1 period and the resultant RPO siganl is monitored. This procedure is repeated until the signal RPO is shifted to the high state a predetermined number of times (four in the embodiment; see a flow chart described later). As the result, the microcomputer 10 judges that the viewfinder 6 is being used by the operator. Although the length of the following cycle of T1 and T2 is identical to that of the initial cycle, it may be varied.

Figure 18:
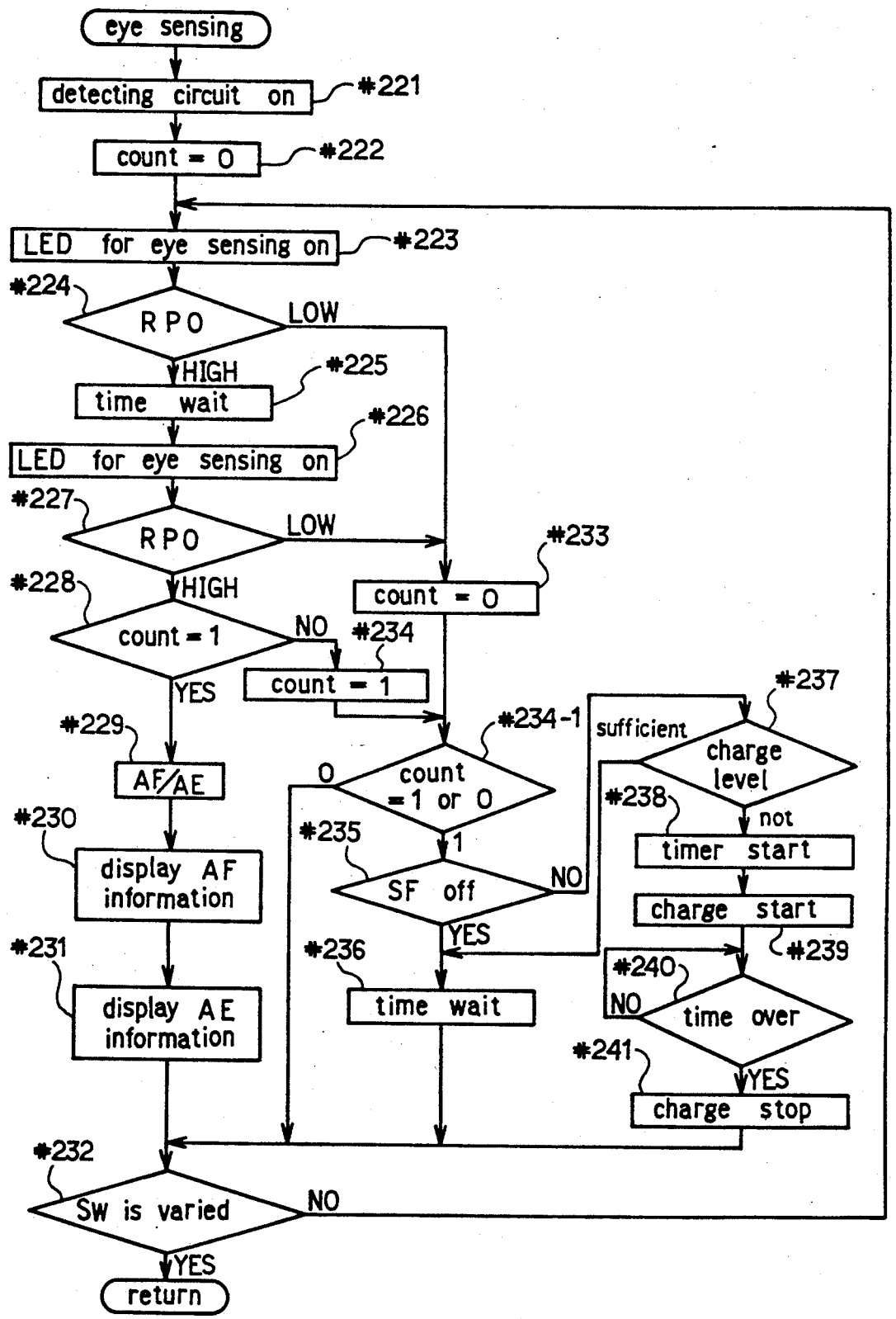
FIG. 18 is a flow chart showing a sequence of eye sensing action of the same.

A sequence of eye sensing action in this embodiment will now be described referring to the flow chart of FIG. 18.

Figure 17:
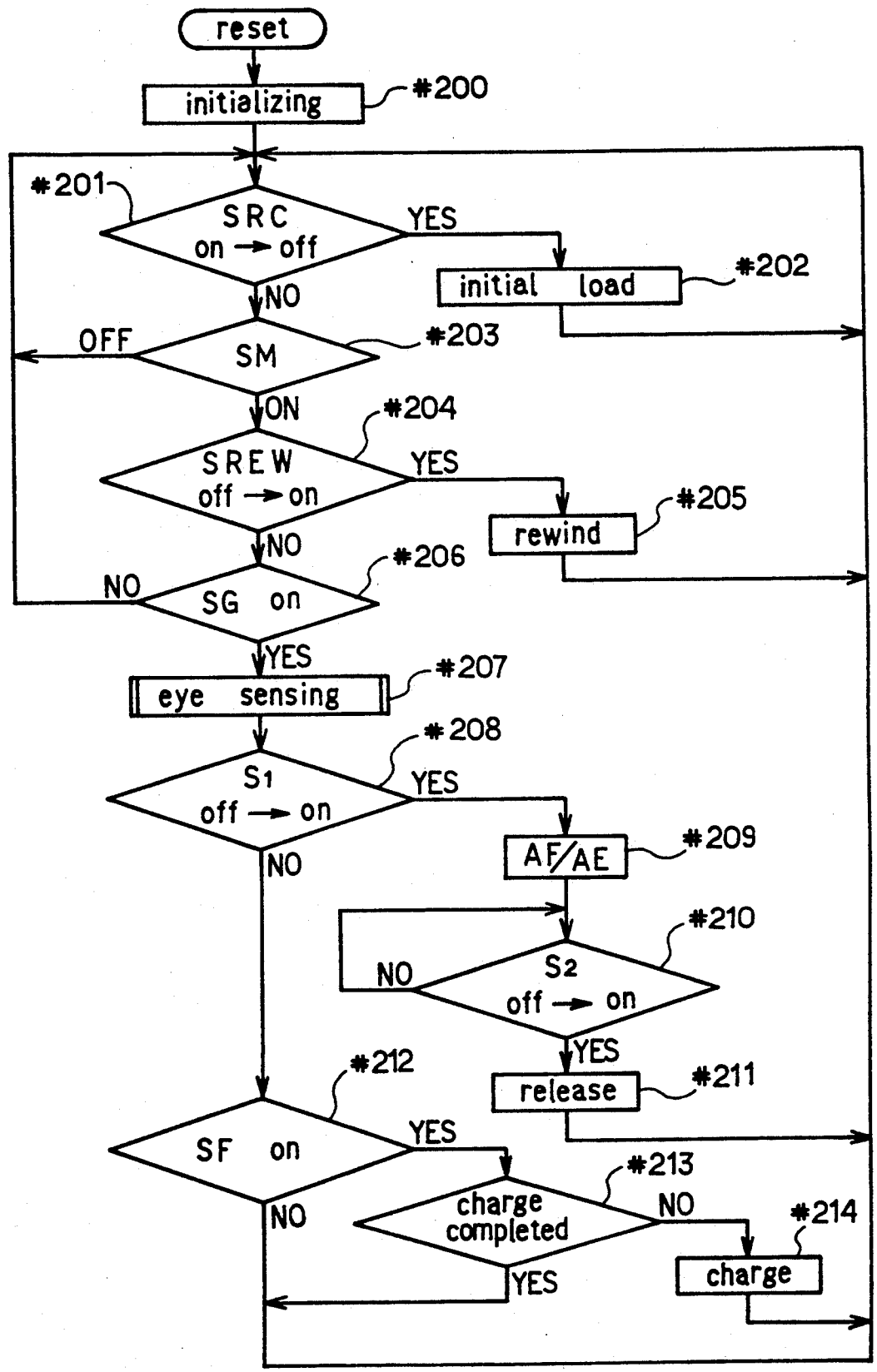
FIG. 17 is a flow chart showing a sequence of control action of the camera.

When the grip switch SG is detected turned on at Step 206 of FIG. 17, the action of the flow chart starts.

The eye sensing circuit 29 is first switched on at Step 221 and a counter for eye sensing pulse counting is cleared off at step 222. The LED 7 is then activated for a given time at step 223 and the detection signal RPO is examined at Step 224. If the signal RPO is at high, the procedure goes to Step 225 and if at low, to Step 233. At Step 225, the procedure is retarded a given time (e.g. 5 milliseconds) for prevention of erroneous detecting action caused by noise signals.

The LED 7 is activated again for a given time at Step 226 and similarly, the detected signal RPO is checked at Step 227. If the signal RPO is at high, the procedure goes to Step 228 and if at low, to Step 233.

At Step 228, the counter for eye sensing pulse counting is checked. If the resultant count is "0", it is corrected to "1" at Step 234 and the procedure advances to Step 234-1. If the count is already "1", it is judged that the viewfinder 6 is occupied and the procedure goes to Step 229.

Even when the signal RPO is detected at high, at Step 224 or 227, thus indicating that the viewfinder is occupied, the count remains "0" in the first execution of the sequence which does not pass Step 234. Accordingly, it is judged "NO" at Step 228 and the count is corrected to "1" at Step 234. Then, the procedure proceeds from Steps 234-1 to 235. If flash lighting is needed while the charging being uncompleted, the procedure takes Step 237 and the succeeding Steps for performing a charging. As the result, the charging to the flash lighting capacitor can effectively be executed with using an interval, not-assigned periods during the eye sensing action.

At Step 229, both AF and AE control actions are carried out. The data of AF and AE control is displayed on the LCD panel 22 at Steps 230 and 231. The switches SM, SF, S1, SG, and SREW are shecked at Step 232. If no switch is changed, the procedure returns to Step 223 for repeating the sequence. If any one of the switches is changed, the procedure returns, namely goes to Step 208.

When the procedure goes to Steps 224 and 227 to Step 233, the signal RPO is at low. Then, the eye sensing pulse counter is cleared and the procedure goes to Step 234-1 where the counter is examined whether it is "1" or "0". The count is "1" when comes from Step 234 (indicating that the viewfinder is occupied) and thus, the procedure goes to Step 235 where it is judged that the photographing action is commenced and the flash switch SF is checked whether it is on or off. If off (i.e. the flash is not used), the procedure goes to Step 236. If the switch SF is on (i.e. the flash is in use), the procedure goes to Step 237. At Step 236, the procedure is retarded a given time (e.g. 250 milliseconds) and then, goes to Step 232 where each of the switches is checked.

At Step 237, the charging level in the flash lighting capacitor is examined whether it is sufficient or not. If the charged voltage is increased to a desired value, the procedure goes to Step 236. If not sufficient, the procedure goes to Step 238 where a charging timer (with setting of e.g. 250 ms) is started. Charging action starts at Step 239 and the time by the charging timer is over at Step 240. Then, the procedure goes to Step 241 where the charging is finished and to Step 232. After each of the switches is checked at Step 232, the same sequence is repeated.

According to the second embodiment, the start of photographing with the use of flash lighting is determined by the eye sensing action. If the capacitor for flash lighting is not in charged-up, it is intermittently charged during the interval periods of the eye sensing action prior to actuation of the shutter release. Hence, the charging of the capacitor to a desired level can efficiently be carried out with the best use of the interval periods in the eye sensing action prior to the shutter release action. As the result, no delay action in the shutter release procedure is expected and the probability of release lock action is minimized. More particularly, no waste time prior to the shutter release action is produced thus allowing the operator to be free from irritating standby state.

The present invention is not limited to the foregoing embodiments and various modifications will be possible. For example, the standby period of T2 during the low state of the detection signal RPO (i.e. the viewfinder 6 is not occupied) as provided at Step 224 or 227 will be utilized by performing another functional action. During the standby period may be used to change the flash lighting capacitor in order to avoid unworkable condition caused by no charged-up when flash is used.

What is claimed is:

1. A camera with an eye sensing control comprising;
   a detecting means for examining whether any object is presently adjacent to a viewfinder or not;
   a first controlling means for controlling the detecting means so that the object near the viewfinder is repeatedly detected at first intervals, and after the presence is detected, at least another detecting action is executed at second intervals shorter than the first intervals; and
   a second controlling means for controlling the camera action according to a result of the repeated detection of the detecting means.

2. A camera according to claim 1, wherein the second intervals are shorter than the period of an adjacent ac power source.

3. A camera according to claim 1, wherein the detecting means contains a light emitting element and a light receiving element.

* * * * *